United States Patent
Ho et al.

(10) Patent No.: US 7,058,496 B2
(45) Date of Patent: Jun. 6, 2006

(54) METHOD AND APPARATUS FOR DETERMINING A VEHICLE GEAR RATIO

(75) Inventors: Yun Ren Ho, Naperville, IL (US); John G. Brome, Delavan, WI (US); Aziz Talbi, Davenport, IA (US)

(73) Assignee: CNH America LLC, New Holland, PA (US)

( * ) Notice: Subject to any disclaimer, the term of this patent is extended or adjusted under 35 U.S.C. 154(b) by 196 days.

(21) Appl. No.: 10/783,547

(22) Filed: Feb. 20, 2004

(65) Prior Publication Data
US 2005/0187691 A1    Aug. 25, 2005

(51) Int. Cl.
G06F 7/00 (2006.01)
B60W 10/10 (2006.01)

(52) U.S. Cl. ............................ 701/55; 701/62; 701/64; 477/34

(58) Field of Classification Search ............ 701/51–55, 701/61, 62, 64; 477/34, 36, 20; 192/351, 192/20
See application file for complete search history.

(56) References Cited

U.S. PATENT DOCUMENTS

| | | | |
|---|---|---|---|
| 4,799,158 A | 1/1989 | Patil | |
| 4,821,190 A | 4/1989 | Patil | |
| 5,473,541 A | 12/1995 | Ishino et al. | |
| 5,477,454 A | 12/1995 | Ishino et al. | |
| 5,477,455 A | 12/1995 | Ishino et al. | |
| 5,498,216 A * | 3/1996 | Bitsche et al. | 477/20 |
| 5,611,405 A | 3/1997 | Ishino et al. | |
| 5,871,419 A | 2/1999 | Amendt | |
| RE36,151 E | 3/1999 | Ishino et al. | |
| 5,967,940 A | 10/1999 | Yamaguchi | |
| 6,202,016 B1 | 3/2001 | Stephenson et al. | |
| 6,343,250 B1 | 1/2002 | Kuras et al. | |
| 6,377,883 B1 | 4/2002 | Shimabukoro et al. | |
| 6,379,280 B1 | 4/2002 | Ogawa et al. | |
| 6,609,056 B1 | 8/2003 | Czarnecki et al. | |
| 2003/0036836 A1 | 2/2003 | Miller | |
| 2003/0226707 A1 | 12/2003 | Ho et al. | |
| 2003/0228893 A1 | 12/2003 | Ho et al. | |
| 2003/0229432 A1 | 12/2003 | Ho et al. | |

* cited by examiner

*Primary Examiner*—Yonel Beaulieu
(74) *Attorney, Agent, or Firm*—Michael G. Harms; John William Stader; Stephen A. Bucchianeri

(57) ABSTRACT

An electronic control system includes two speed sensors connected to a microcontroller that is configured to read the sensors and perform the process of determining the gear ratio of a vehicle gearbox. The process includes calculating (several times) which of at least two gear ratios the gearbox is engaged in, then adding up the number of times each of the gear ratios was calculated, and then selecting the gear ratio that was calculated the most times as the true gear ratio.

23 Claims, 6 Drawing Sheets

METHOD AND APPARATUS FOR DETERMINING A VEHICLE GEAR RATIO

FIELD OF THE INVENTION

The invention relates to work vehicles such as agricultural combines. More particularly, it relates to work vehicles having gearboxes without a gear select sensor. Even more particularly, it relates to such vehicles having electronic control systems configured to determine gear ratios.

BACKGROUND OF THE INVENTION

Work vehicles such as agricultural combines monitor a variety of drive parameters. They have a variety of sensors responsive to pressures, speeds and positions of the various components that comprise the drive system.

For example, a sensor may directly indicate the gear ratio or gear range of a gearbox in the drive system. Other sensors may measure different parameters, such as hydraulic pressure, rotational speed, and other parameters.

In some vehicles, system parameters such as gear ratios may not be sensed directly, but may be determined by combining sensor data and knowledge of the mathematical system model to calculate or otherwise determine these system parameters.

An example of such a system is disclosed in the assignee's co-pending U.S. patent application Ser. No. 10/167,310 ("310 application") filed Jun. 11, 2002, for a "COMBINE HAVING A SYSTEM ESTIMATOR TO AUTOMATICALLY ESTIMATE AND DYNAMICALLY CHANGE A TARGET CONTROL PARAMETER IN A CONTROL ALGORITHM". In this application, a gear ratio is determined by an electronic controller coupled to a motor speed sensor and a rotor speed sensor. By monitoring a gearbox input speed (the motor) and a gearbox output speed (the rotor) the system of the '310 application is able to determine the selected gearbox gear ratio indirectly.

The system and method of the '310 application is not without limitations. It is predicated on accurately calculating the speed range during an initial 1.3 second hydrostatic rotor acceleration phase. It also requires correct operation of the motor speed sensor. Should the motor sensor fail, the system may not be able to accurately determine the gear ratio.

It is an object of this invention to provide an improved system and method for determining the gear ratio of a gearbox.

It is also an object of this invention to provide for a redundant method to determine gearbox ratios.

SUMMARY OF THE INVENTION

In accordance with a first aspect of the invention, a process for determining whether a vehicle gearbox is engaged in at least a first gear ratio or a second gear ratio is provided, the process comprising calculating which of the first and second gear ratios the gearbox is engaged; repeating the steps of calculating a plurality of times; summing the results of said calculations; and selecting between the first and second gear ratios based at least upon the results of the step of summing.

The step of calculating may include the step of determining a speed ratio. The speed ratio may be a ratio of an input speed to said gearbox and an output speed from said gearbox. The step of summing may include the steps of summing occurrences of first gear ratio determinations and summing occurrences of second gear ratio determinations. The step of selecting between the first and second gear ratios may include determining whether the sum of first gear ratio determinations is greater than the sum of second gear ratio determinations. The step of selecting between the first and second gear ratios may include the step of determining whether the sum of first gear ratio determinations and the sum of second gear ratio determinations exceed a minimum value. The step of calculating may include the step of determining a ratio of a motor speed signal and a rotor speed signal, and further wherein the step of selecting between includes the step of rejecting both the first and second gear ratios. The process may further include the steps of waiting an interval of time after the step of rejecting, and calculating which of the first and second gear ratios the gearbox is engaged in after the step of waiting.

In accordance with a second aspect of the invention, an apparatus for determining whether a vehicle gearbox is engaged in at least a first gear ratio or a second gear ratio is provided, the apparatus including means for calculating which of the first and second gear ratios the gearbox is engaged; means for repeating the steps of calculating a plurality of times; means for summing the results of said calculations; and means for selecting between the first and second gear ratios based at least upon the results of the step of summing.

The means for calculating may include a means for determining a speed ratio. The speed ratio may be a ratio of an input speed to said gearbox and an output speed from said gearbox. The means for summing may include means for summing occurrences of first gear ratio determinations and means for summing occurrences of second gear ratio determinations. The means for selecting between the first and second gear ratios may include means for determining whether the sum of first gear ratio determinations is greater than the sum of second gear ratio determinations. The means for selecting between the first and second gear ratios may include means for determining whether the sum of first gear ratio determinations and the sum of second gear ratio determinations exceed a minimum value. The means for calculating may include means for determining a ratio of a motor speed signal and a rotor speed signal, and further wherein means for selecting between includes means for rejecting both the first and second gear ratios. The apparatus may further include means for waiting an interval of time after the step of rejecting: and means for calculating which of the first and second gear ratios the gearbox is engaged in, after the step of waiting.

In accordance with a third aspect of the invention an electronic control system for determining whether a vehicle gearbox is engaged in at least a first gear ratio or a second gear ratio is provided, including a first speed sensor; a second speed sensor; and at least one microcontroller configured to calculate at least twice which of the first and second gear ratios the gearbox is engaged in, sum the results of said calculations, and select between the first and second gear ratios based at least upon the summed results.

The at least one microcontroller may be configured to determine a speed ratio. The speed ratio may be a ratio of a shaft input speed to said gearbox and a shaft output speed from said gearbox. The at least one microcontroller may be configured to sum occurrences of first gear ratio determinations and sum occurrences of second gear ratio determinations. The at least one microcontroller may be configured to determine whether the sum of first gear ratio determinations is greater than the sum of second gear ratio determinations. The at least one microcontroller may be configured to determine whether the sum of first gear ratio determinations and the sum of second gear ratio determinations exceed a minimum value. The at least one microcontroller may be configured to determine a ratio of a motor speed signal and a rotor speed signal, and to reject both the first and second gear ratios. The at least one microcontroller may be configured to wait an interval of time after the step of rejecting; and calculate in which of the first and second gear ratios the gearbox is engaged after the step of waiting. The gearbox may be engageable in at least three gear ratios. The speed ratio may be a ratio of an engine speed and rotor speed.

DETAILED DESCRIPTION OF THE INVENTION

Figure 1:
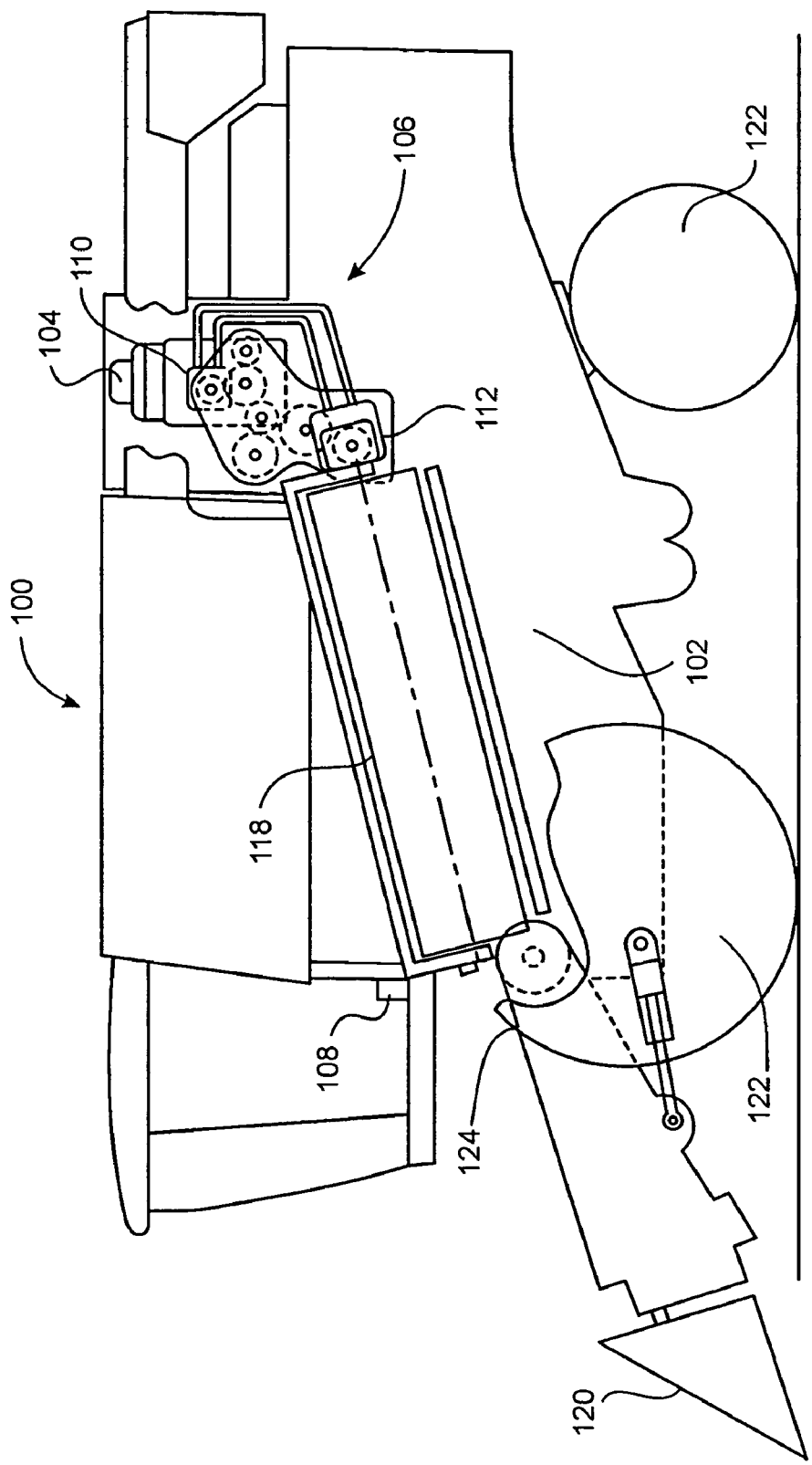
FIG. 1 is a side schematic view of an agricultural combine having a gearbox with gear ratios determined by the present invention.

Referring to FIG. 1, a work vehicle is illustrated, here shown as an agricultural combine 100. The work vehicle has a chassis 102 on which an engine 104 is mounted. A drive system 106 is coupled to and driven by engine 104 to rotate rotor 118. An electronic control system 108 is coupled to the engine and the drive system to monitor various sensors, to control the engine and to control the drive system.

The engine 104 is preferably an internal combustion engine, such as a multi-cylinder gasoline or diesel engine.

The drive system 106 includes a hydraulic pump 110 that is coupled to and driven by the engine, a hydraulic motor 112 that is fluidly coupled to and driven by pump 110, a gear train coupling engine 104 to the pump, a gear train coupling engine 104 to a planetary gear arrangement, the planetary gear arrangement 114 (FIG. 2) itself, and a gearbox 116 (FIG. 2) that drives the combine rotor 118.

Rotor 118 rotates with respect to chassis 102 and threshes agricultural material, such as corn stalks. A header 120 is attached to the front of the combine to cut and gather the agricultural material from the field and direct it into the rotor, via the feeder 124, which receives and threshes it.

A plurality of wheels 122 are coupled to the chassis to engage the ground and support the combine as it travels over the ground. One or more motors (not shown) may be coupled to the wheels to drive the wheels in rotation, thereby driving the combine over the ground.

Figure 2:
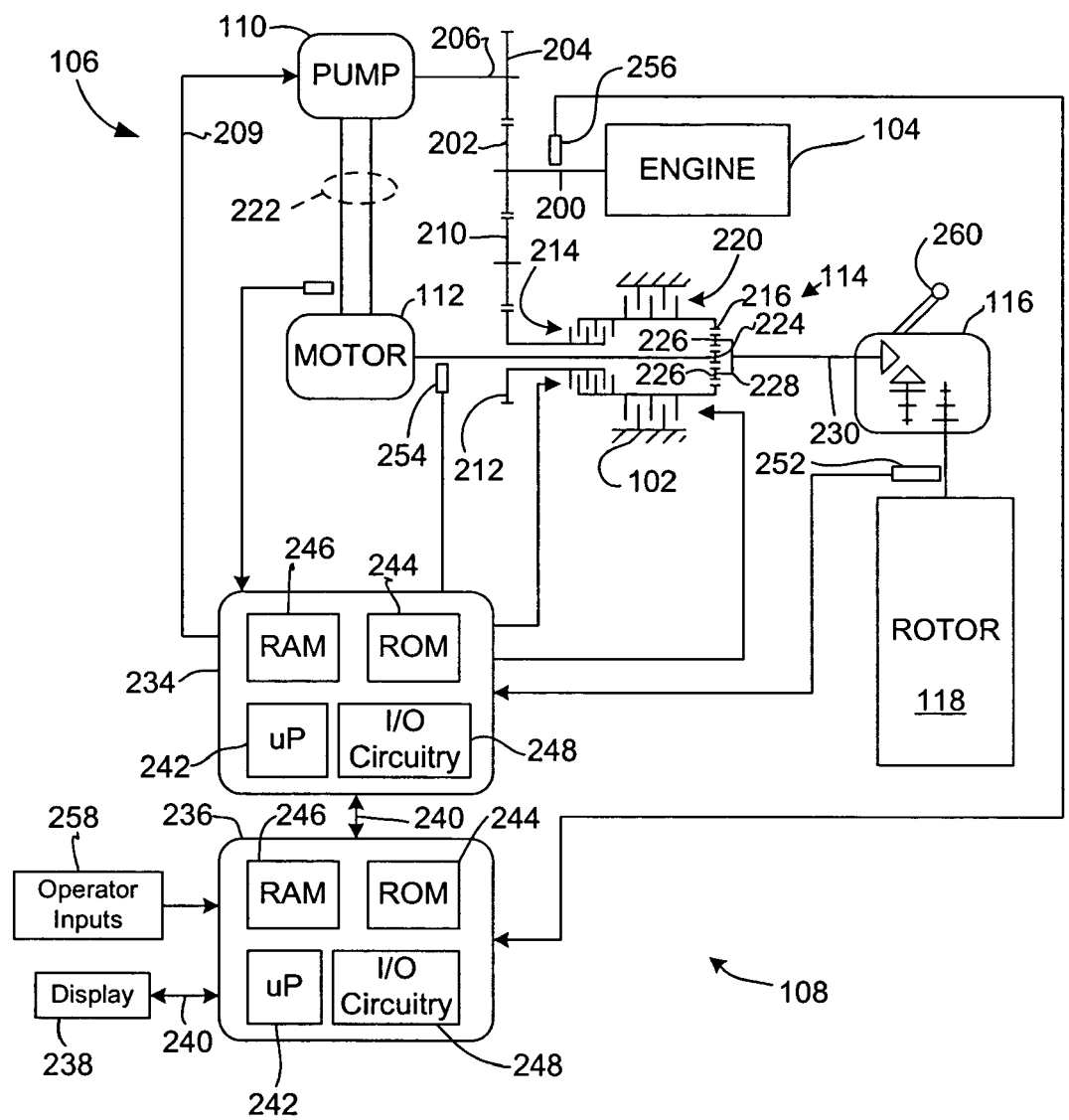
FIG. 2 is an electronic, hydraulic and mechanical schematic diagram of the drive system of the combine of FIG. 1.

FIG. 2 illustrates construction details of the work vehicle (and particularly the drive system 106) in a schematic form. Engine 104 has an output shaft 200 to which spur gear 202 is fixed. Gear 202 drives spur gear 204. Spur gear 204 is fixed to shaft 206, which is the input shaft to hydraulic pump 110.

Hydraulic pump 110 is a variable displacement pump in which the specific output can be varied under electrical control. In particular, pump 110 has internal actuators to vary the displacement of the pump in response to an electrical signal. Controller 234 applies the signal to pump 110 over electrical control lines 209.

Gear 202 also meshes with and drives spur gear 210, which is coupled to and drives the auger and header (not shown). Spur gear 210, in turn, meshes with and drives spur gear 212. Spur gear 212, in turn, is coupled to and drives the input shaft of engine-to-ring clutch 214.

Engine-to-ring clutch 214 is a hydraulically actuated multi-plate clutch that couples gear 212 (and hence engine 104) to ring gear 216 of planetary gear arrangement 114. When clutch 214 is engaged, engine 104 is coupled to and drives ring gear 216. When clutch 214 is disengaged, engine 104 is disconnected from ring gear 216.

A second clutch 220 (a ring-to-frame clutch) is coupled to and between ring gear 216 and the frame or chassis 102 (indicated by the ground symbol) to fix the ring gear with respect to the chassis or frame of the vehicle. When clutch 220 is engaged, ring gear 216 is fixed and cannot rotate.

Pump 110 is hydraulically connected to motor 112 by hydraulic conduits 222. These conduits conduct fluid to and from motor 112 to form a closed loop hydraulic (hydrostatic) drive circuit.

Motor 112 is coupled to and drives sun gear 224 of planetary gear arrangement 114. Sun gear 224 drives planet gears 226, which drive planetary gear carrier 228.

Gearbox 116 is a multi-speed gearbox having a neutral and three manually selectable gear ratios with an input shaft 230 and an output shaft coupled to rotor 118.

Input shaft 230 of gearbox 116 is fixed to and rotates together with planetary gear carrier 228. The output shaft of multi-speed gearbox 116 is coupled to and drives rotor 118.

It should be clear that power from engine 104 to rotor 118 can follow one or both of two parallel paths. The first path is from engine 104, through the gearing, through clutch 214, through ring gear 216, through planet gears 226 into shaft 230. The second parallel path is from engine 104, through pump 110, through motor 112, through sun gear 224, through the planet gears 226 and into shaft 230.

The normal mode of operation, however, is one in which power through both paths is provided to the rotor. Engine 104 operates most efficiently at a set and predetermined rpm, yet the rotor cannot be operated at a set, predetermined speed, but must be variable over some range or ranges of speed to harvest the several types of crops it is intended and designed to do.

To provide this variable rotor speed, two parallel power paths are provided. The planetary gear arrangement permits power through both paths to be applied to the rotor. The motor drives the sun gear, the engine drives the ring gear, and the planetary gear carrier receives power from both and applies that combined power to the rotor through gearbox 116.

Electronics

The electronic control system 108, including three digital electronic controllers and their associated sensors, controls the operation of the foregoing machine elements.

System 108 includes a first digital electronic controller 234, a second digital electronic controller 236 and a third digital electronic controller 238 that are coupled together over a communications network, here shown as a CAN bus 240 in accordance with the SAE J1939 communications standard.

Each controller 234, 236, and 238 are similarly constructed, and include a microprocessor 242, a read-only memory (ROM) 244, a random access memory (RAM) 246 and an input/output (I/O) circuit 248. The ROM stores a control program that controls the operation of the controller. The RAM is temporary storage space for numeric values used in computation, and the I/O circuit handles external communications including communications with the sensors and the other controllers on the CAN bus 240. Each of these circuits is connected using a data/address/control bus of standard design, which is not shown.

The first digital controller 234 is connected to two speed sensors, a rotor speed sensor 252, and a motor speed sensor 254. These sensors are respectively coupled to rotor 118 and motor 112 to sense the rotational speeds of these devices and transmit a signal indicative of those speeds to the first digital controller 234.

The speed sensors in the present system preferably generate a series or stream of pulses as the rotor and motor turn.

Common sensor arrangements that generate such pulse sequences include conditioned alternator signals, Hall Effect devices, and inductive pickups that sense the passage of slotted disks or gear teeth mounted on the shafts of the engine, rotor and motor, for example.

The first digital controller 234 is also connected to and controls three other devices: pump 110, engine-to-ring clutch 214 and ring-to-frame clutch 220.

Controller 234 generates and transmits a signal indicative of a desired specific displacement to pump 110. Pump 110 responsively changes its specific displacement to match the signal. In a similar fashion, controller 234 generates and transmits a clutch-engaging or clutch-disengaging signal to electrical solenoid valves (not shown) that conduct hydraulic fluid to and from the two clutches 214 and 220. The clutches responsively engage and disengage.

The I/O circuit of second digital controller 236 is connected to an engine speed sensor 256 and to operator input device 258. Engine speed sensor 256 generates a signal indicative of the engine speed. The operator input device is preferably a switch responsive to operator manipulation that generates two separate signals, an "increase speed" signal and a "decrease speed" signal. Controller 236 is also connected to controller 234 and controller 238 via the CAN bus 240.

The third and final controller, controller 238, is a display controller. It is constructed the same as controller 234 and 236, but is dedicated to displaying data generated by the operator or the other controllers. This capability is provided by its own internal control program stored in its ROM memory. It also includes a display device such as an LCD or electroluminescent display.

Programming

Controllers 234, 236, and 238 include internal digital control programs that control their operation. These programs are stored in the ROM memory of each controller. The programmed operation of each controller is discussed below.

During normal operation, controller 238 displays several data indicative of the vehicle's status. The first of these, the rotor speed, indicates the speed of the rotor. Controller 234 generates the rotor speed data from the rotor speed signal transmitted to controller 234 from rotor speed sensor 252. Controller 234 periodically calculates the rotor speed from the rotor speed signal and places this information on the CAN bus. The rotor speed is preferably calculated and placed on the CAN bus in regular intervals.

Controller 238 is programmed to receive this rotor speed data over the CAN bus, and to translate them into display signals to drive its integral display. It applies the display signals to the display, thereby generating decimal digits on the display that represent the rotor speed. The display indicates the rotor speed as a sequence of decimal digits expressed in revolutions per minute.

Controller 238 also displays the current range of rotor speed. This range is displayed in the form of an upper and a lower limiting rotor speed. These limits are typically generated by controller 234 and transmitted in regular intervals over the CAN bus to controller 238.

Controller 238 receives these speed range signals, translates them into display signals to drive its integral display, and applies the signals to the display thereby generating decimal digits on the display that represent the upper and lower rotor speed limit values. These values are preferably expressed in revolutions per minute.

Controller 236 receives the increase-rotor-speed and the decrease-rotor-speed signals (also known as operator speed requests or commands) from operator input device 258 when the operator manipulates the operator input device. Controller 236 transmits these operator requests on the CAN bus. Controller 234 receives these operator requests and attempts to raise or lower the rotor speed accordingly, Controller 234 controls the rotor speed by changing the specific displacement of pump 110. Controller 234 is programmed to execute a conventional PID control loop that uses the commanded rotor speed (from the operator input device), the actual rotor speed (provided by the rotor speed sensor) as inputs, and generates a signal that is applied to pump 110 as the output. The difference between the actual rotor speed and the commanded rotor speed is the error signal that is minimized by the PID control loop.

Controller 234 changes the commanded rotor speed based at least on two things: first, a command by the operator using the operator input device to either raise or lower the current commanded speed, and second, controller's (234) determination that the rotor can indeed be driven at the new speed requested by the operator. If both conditions are met, controller 234 changes the commanded rotor speed according to the PID design.

Controller 234 also determines whether the motor or the engine (or both) drives the rotor by selectively engaging and disengaging the engine-to-ring clutch 214 and the ring-to-frame clutch 220. In the discussion below, controller 234 transmits engagement and disengagement signals to the hydraulic valve (not shown) that controls the engine-to-ring clutch 214, causing it to become engaged (thereby connecting the engine to the ring gear) and disengaged (breaking the engine-to-ring gear connection). Controller 234 also transmits engagement and disengagement signals to the hydraulic valve controlling the ring-to-frame clutch, causing it to engage (locking the ring with respect to the chassis or frame) and to disengage (releasing the ring).

In the normal harvesting mode, discussed herein, both the motor and the engine drive the rotor. In this mode, called the hydro-mechanical mode, the engine runs at a relatively constant speed of 2150 rpm which, through the gearing and engine-to-ring clutch 214 connecting the engine to the ring gear, causes the ring gear to rotate at 2188 rpm.

The motor 112 is designed to be bi-directionally driven by pump 110 over a range of speeds from −4077 rpm to +3114 rpm. Given the gear ratios of the planetary gear arrangement, these speeds cause planetary gear carrier 228 to rotate at speeds ranging from 1144 to 2342 rpm.

In the normal (or hydro-mechanical) mode the rotor can be driven at an infinite number of speeds in either direction since the motor has a limited range of operating speeds, the engine operates at a relatively fixed speed, and gearbox 116 has a predetermined set of gear ratios. By "gear ratio" we mean the ratio of gearbox input shaft speed versus gearbox output shaft speed. Given these constraints, for any selected gear ratio of gearbox 116, there is an associated and predetermined range of permissible rotor speeds. These speeds are expressed as a rotor speed upper limit and a rotor speed lower limit.

The input shaft 230 of gearbox 116 is connected to and driven by the planetary gear carrier 228. The gearbox has a neutral and three different selectable gear ratios—ratios of gearbox input shaft to output shaft speeds. These gear ratios are selectable by manual operator manipulation of a conventional gearshift lever 260.

Given the gear ratio of the planetary gear arrangement, input shaft 230 of gearbox 116 rotates at speeds of between 1144 and 2342 rpm; at 1144 rpm, the motor is rotating at −4077 rpm. At 2342 rpm, the motor is rotating at 3114 rpm.

The highest gearbox gear ratio rotates the output shaft of the gearbox (and the rotor to which it is coupled) at a speed of between 589 and 1206 rpm. For the middle gear ratio, this speed is between 391 and 800 rpm. For the lowest gear ratio, this speed is between 222 and 454 rpm. The output shaft speed varies with the motor speed.

When the motor rotates at −4077 rpm (and, again, assuming a fixed engine speed of 2150 rpm), the rotor rotates at 589, 391, or 222 rpm, depending upon the gearbox 116 gear ratio. When the motor rotates at +3114 rpm, the rotor rotates at 1206, 800, or 454 rpm, depending upon the gear ratio.

Controller 234 achieves intermediate speeds within these rotor speed ranges by varying the motor speed from −4077 to +3114 rpm. Controller 234 does this by changing the displacement of pump 110 according to the PID control design.

The operator is interested in controlling the rotor speed, since the rotor speed determines the rate at which the combine performs its work. It is for this reason that controller 234 is configured to transmit the rotor speed on the CAN bus 240 to controller 238 to be displayed.

The operator can select any rotor speed, however, but the ranges of permissible rotor speeds are limited based upon the selected gear ratio of gearbox 116. Each gearbox gear ratio has its own associated range of rotor speeds. As a result, the operator is also interested in knowing the range of rotor speeds within which he can select the commanded rotor speed. It is for this reason that controller 234 transmits the rotor speed range (which depend upon the currently selected gearbox gear ratio) on the CAN bus to controller 238 to be displayed, since controller 234 defines the upper and lower permissible rotor speeds.

Dynamic System Model

The drive train system is modeled as a dynamic system having three inputs and a single output. The inputs are (a) motor speed, (b) rotor speed, and (c) engine speed. The physical output is the gear ratio. The model below, expressed as a series of equations that represent the dynamic response of the system, is applicable to the drive system when the engine-to-ring clutch 214 is engaged, and the ring-to-frame clutch is disengaged.

The relationship between these measurable inputs and outputs are expressed in the following equations 1–3. There are three equations since there are three different operator selectable gear ratios, representing the dynamic response to the drive system when the engine-to-ring clutch 214 is engaged and the ring-to-frame clutch is disengaged.

$$RS = K1*(KX*KZ*ES + KY*MS) \quad \text{Eqn. 1}$$

$$RS = K2*(KX*KZ*ES + KY*MS) \quad \text{Eqn. 2}$$

$$RS = K3*(KX*KZ*ES + KY*MS) \quad \text{Eqn. 3}$$

RS is the rotor speed. ES is the engine speed. MS is the motor speed. K1, K2 and K3 are constants corresponding to the high, medium and low gear ratios, respectively, provided by gearbox 116. KX and KY are constants corresponding to the mathematical model of the planetary gear arrangement. KZ is a constant corresponding to the model of the gear train between engine 104 and the ring gear.

These three equations can be summarized as follows:

$$RS = KGR*(KX*KZ*ES + KY*MS) \quad \text{Eqn. 3a}$$

where KGR is the gear ratio of the gearbox. KGR will equal either K1, K2 or K3 depending upon the gearbox's selected gear ratio.

Equations 1–3 are one expression of the mathematical dynamic system model of the drive system expressed in a rather condensed form. The details of the model can be seen in the sub-equations that model each sub-equation of the drive system, which are described below.

The engine to ring gear drive train model is as follows:

$$RGS = ES*KZ \quad \text{Eqn. 4}$$

where RGS is ring gear speed, ES is engine speed, and KZ is constant equal (in this embodiment) to 2188 rpm/2150 rpm or 1.017. This is true when the engine-to-ring clutch 214 is engaged and the ring-to-frame clutch is disengaged. However, when the engine-to-ring clutch 214 is disengaged and the ring-to-frame clutch is engaged, the engine is no longer coupled to the ring gear and the two can vary.

The model that represents this mode of operation (the motor alone driving the rotor) is a variation on the model expressed in the existing equations herein and is also stored in controller 234 to permit gear ratio to be estimated when the motor alone drives the rotor.

This variant of the existing equations (and hence the variant mathematical model) is provided by setting the engine speed (ES) and the ring gear speed (RGS) equal to zero in the equations. If these two substitutions are made in the equations herein, the modified equations represent a variant model of the system as it operates when the engine is disengaged from the rotor and the rotor is driven only by the motor.

Thus, controller 234 also includes a variant mathematical model of the drive system that it uses to estimate gear ratio for the case in which the ring is stopped and locked to the chassis via the ring-to-frame clutch and only the motor is driving the rotor.

The motor to planetary gear arrangement model is as follows:

$$MS = SGS \quad \text{Eqn. 5}$$

where MS is motor speed and SGS is sun gear speed. This relation indicates that the motor and the sun gear turn at the same speed, since the sun gear is fixed to the motor shaft.

The planetary gear arrangement model is as follows:

$$PSS = KX*RGS + KY*SGS \quad \text{Eqn. 6}$$

PSS is the planetary spider speed. RGS is the ring gear speed. SGS is the sun gear speed. KX and KY are constants defined by the geometry of the planetary gear arrangement—by the number of teeth on the planetary gears. KX in this embodiment is 5/6. KY in this embodiment is 1/6.

The planetary to gearbox model is as follows:

$$GIS=PSS \qquad \text{Eqn. 7}$$

GIS is the gearbox input shaft speed. PSS is the planetary spider speed. This is true since the gearbox input shaft is fixed to the planetary gear spider.

The gearbox to rotor model is as follows:

$$RS=K1*GIS \qquad \text{Eqn. 8}$$

$$RS=K2*GIS \qquad \text{Eqn. 9}$$

$$RS=K3*GIS \qquad \text{Eqn. 10}$$

RS is rotor speed. K1, K2, and K3 are three constants corresponding to the high, medium, and low gear ratios of the gearbox 116 and equal to 0.51, 0.34 and 0.19, respectively. There are three equations since there are three different selectable gear ratios in gearbox 116.

The foregoing equations 4–10 are reduced to equations 1–3, which are programmed into the electronic memory of controller 234. They are preferably expressed as infinitesimals, differentials, or in tabular form for quick calculation during operation of controller 234. While this is the preferred system model of the present embodiment, it should be obvious that other equations can be added to accommodate and represent a variety of other interactions as necessary. This would result in more complex drive system models and hence more calculations by controller 234, but would have the advantage of more closely modeling the drive system.

Estimation of Gear Ratio

Controller 234 must know or otherwise determine the gear ratio of gearbox 116 in order to perform various required functions, including displaying rotor speed limits, calculating alarm limits and the like. The discussion below explains how the gear ratios are estimated.

In order to determine the appropriate rotor speed limits to use, the gear ratio could be directly determined if any controller in the system was coupled to a gearbox sensor to indicate the gear ratio directly, such as by sensing the orientation of the gears within gearbox 116, or the position of the gearshift lever 260 of gearbox 116.

This would, however, require the use of an additional sensor to detect those physical parameters. The present system avoids the requirement of a separate gearbox 116 sensor by estimating the gear ratio using either (a) the rotor speed sensor and the engine speed sensor, or (b) the motor speed sensor and the rotor speed sensor.

Controller 234 first attempts to determine gearbox 116 gear ratio based upon the motor speed and the rotor speed. If this attempt fails, controller 234 again attempts to determine the gear ratio based upon the engine speed and the rotor speed.

These attempts to determine gear ratio happen at specific times while the operator initially starts and accelerates rotor 118 to full speed.

Before time t=0 (FIG. 3), the rotor and motor are stopped and the engine is running, with the ring-to-frame clutch engaged, which locks the ring gear with respect to the frame of the vehicle. Controller 234 awaits an operator command to spin the rotor.

At time t=0, the operator initiates threshing using the operator input device. In response, controller 234 signals the pump over signal lines 209 to change its displacement and the corresponding motor speed. This signal is shown in trace 300, which represents the pump command that controller 234 applies to the pump.

Controller 234 gradually increases the pump command from time t=70 to time t=150 as shown in trace 300. Rotor speed trace 306 shows that the rotor speed begins climbing as it is driven by the motor, which in turn is driven by hydraulic fluid from the pump 110.

At time t=150, the controller 234 applies the maximum signal to the pump and the motor 112 has responsively accelerated to its highest forward speed. Rotor 118 responsively spins at its maximum speed in hydrostatic (e.g. motor only) drive mode.

At time t=200, after the rotor 118 has been spinning at a constant speed for 500 milliseconds, the controller 234 begins to speed up the rotor 118 again by coupling the engine with its direct mechanical drive to the rotor 118. To do this, controller 234 disengages the ring-to-frame clutch, permitting the ring gear to spin freely. At the same time, controller 234 rapidly reverses the direction and speed of rotation of the motor 112. This is shown by the sudden and extreme reversal in the pump command (trace 300) that controller 234 applies to the pump.

At time t=240, the rotor 118 is coasting, the motor 112 is starting to spin in the opposite direction, and the ring gear is accelerating to match the speed of the engine. The ring gear speed and the engine speed are approaching one another. Controller 234 starts engaging the engine-to-ring clutch 214 (trace 302) by applying an initial signal (see plateau 308) to the engine-to-ring clutch 214. This signal is calculated to rapidly take up all slack in the engine-to-ring clutch 214 and to bring the clutch to a point of near-engagement.

At time t=270, the engine-to-ring clutch 214 begins to engage and the rotor 118 is again accelerating. To avoid a too-sudden engagement and the attendant shock loads, controller 234 reduces the engine-to-ring clutch 214 signal to a lower level 310 that will provide a more gradual and cushioned engagement.

At time t=375, the rotor 118 has accelerated to nearly a constant speed and the engine-to-ring clutch 214 slippage has dropped. The speeds of the engine and the ring gear are nearly matched. Controller 234 can now fully engage the engine-to-ring clutch 214 without a sudden shock. Controller 234 begins to increase its signal to the engine-to-ring clutch 214 to eliminate all clutch slippage and fully engage the engine-to-ring clutch 214.

At time t=420, the engine 104 and ring gear 216 are fully engaged with no slippage. The engine 104 and motor 112 rotate at a constant speed, driving the rotor 118 at a constant speed as well.

At time t=462, the speeds of the rotor 118, motor 112 and engine 104 have stabilized. The controller 234 begins increasing the signal applied to the pump (trace 300) causing the motor to slow down and stop, and then to begin accelerating on the opposite direction. While the motor 112 slows down, stops, and reverses direction, the rotor 118 again increases in speed (trace 306).

Overview of the Gear Ratio Determination Process

Figure 4:
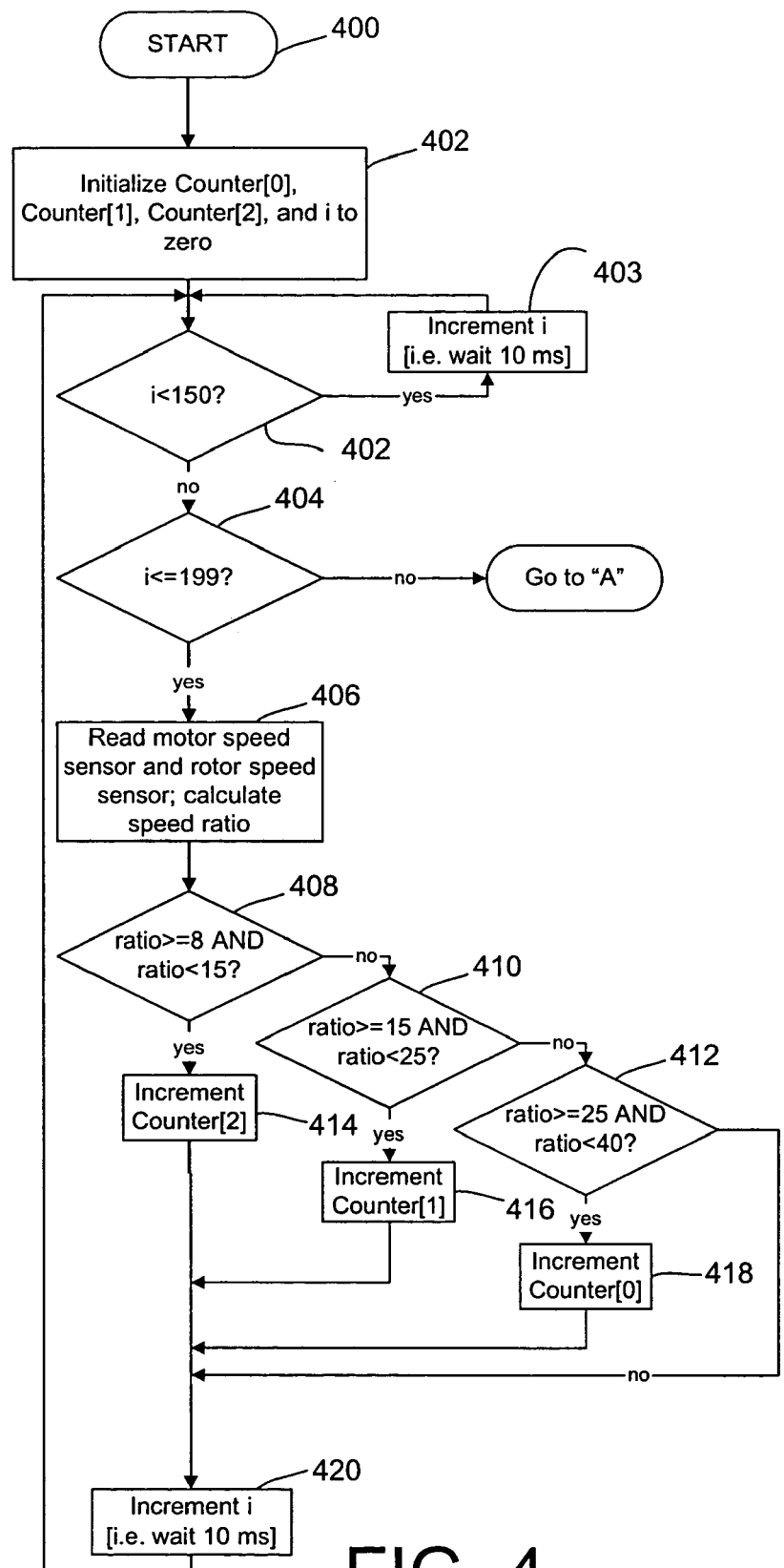
FIG. 4 is a flow chart of a process performed by controller 234 of sequentially calculating gear ratios of a gear box over a first predetermined interval.
Figure 5:
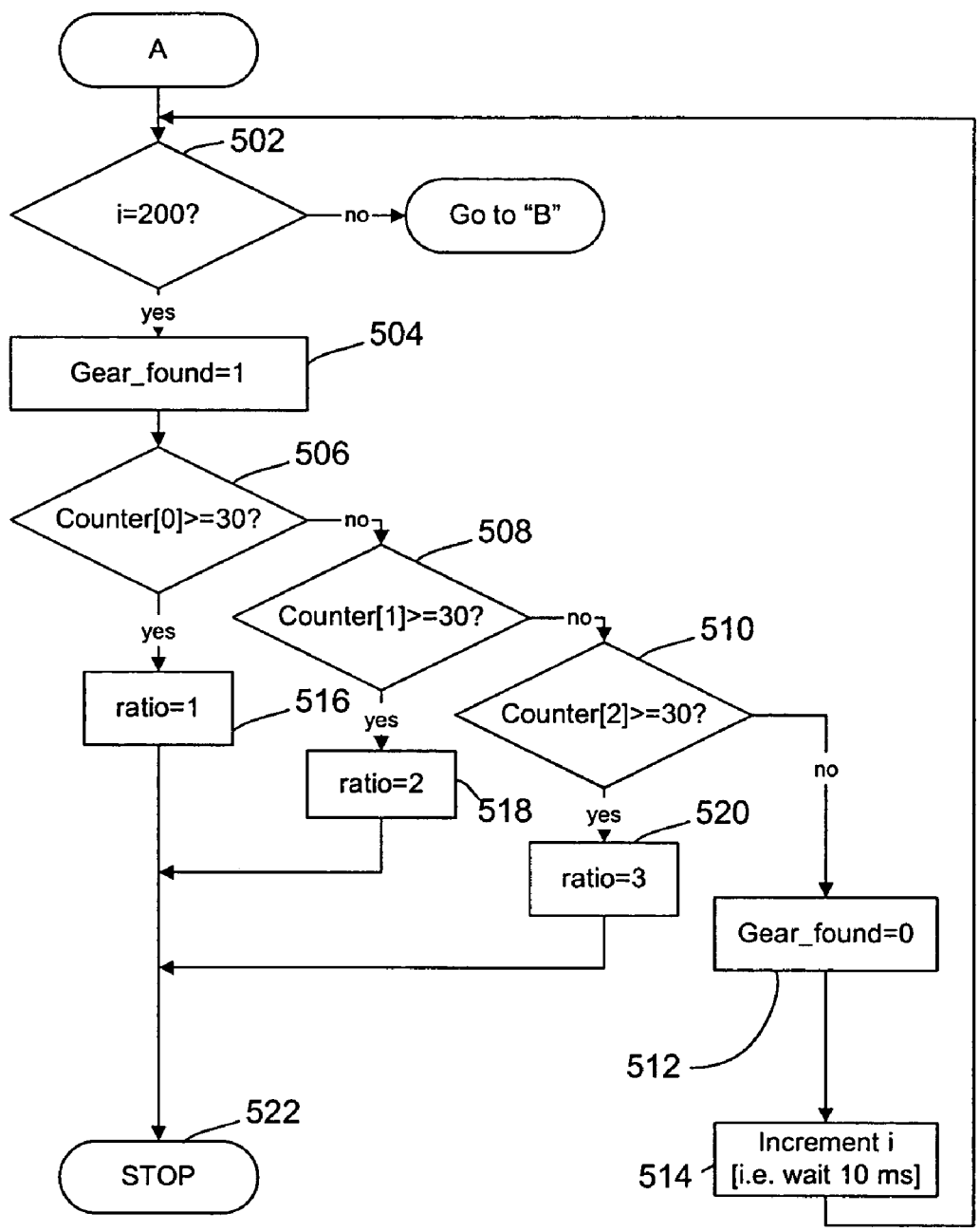
FIG. 5 is a flow chart of the process of selecting between the gear ratios calculated in the process of FIG. 4 performed by controller 234.
Figure 6:
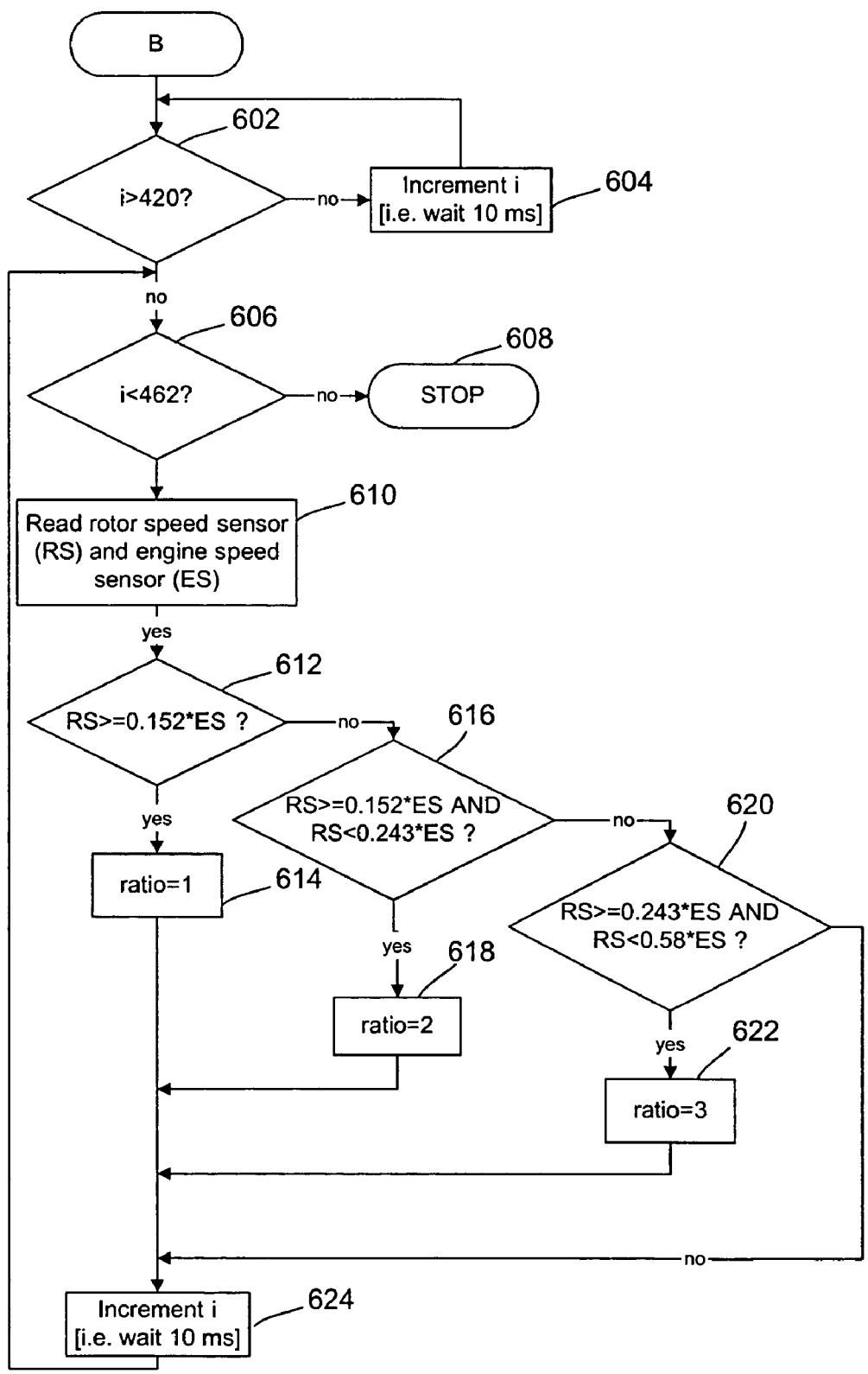
FIG. 6 is a flow chart of a second gear ratio calculation process performed by controller 234 whenever the process of FIGS. 4 and 5 fails.

FIGS. 4, 5, and 6 are flow charts of the operation of controller 234 as it determines the gear ratio of gearbox 116. This is a threefold process.

In the first stage, shown in FIG. 4, controller 234 repeatedly calculates the motor/rotor speed ratio and the corresponding gear ratio of the gearbox fifty times in a row. Each time through it calculates which of the three gear ratios the gearbox is engaged in: first, second or third gear. It repeats this process at least twice, preferably fifty times. Controller 234 simultaneously calculates three sums that are stored in three variables: Counter[0], which indicates how many times controller 234 calculates first gear as the gear ratio; Counter[1], which indicates how many times controller 234 calculates second gear as the gear ratio; and Counter[2], which indicates how many times controller 234 calculates third gear as the gear ratio. In short, controller 234 sums the results of the gear ratio calculations, keeping a running count or sum for each of the three gear ratios it determines. The speed ratio is the ratio of the motor speed (an input to the gearbox) and the rotor speed (an output from the gearbox).

The second stage, shown in FIG. 5, selects between these three sums (i.e. selects between the first, second and third gear ratios) to determine which of these three gear ratios the gearbox is actually engaged in. Theoretically, all the calculated gear ratios should be the same, but due to clutch slippage, sensor errors and other effects, not all of the fifty gear ratio calculations may be the same. In this process of selecting between the gear ratios it has already summed, the controller 234 determines which of the three sums (i.e. Counter[0], Counter[1], or Counter[2]) exceeds a minimum value. In this case, the minimum value is 30 (i.e. controller 234 selected a gear ratio 30 times out of a possible 50 times). Clearly, if controller 234 calculated one of the three gear ratios at least 30 out of 50 total times, the sum corresponding to that gear ratio will be greater than the sum corresponding to either of the other two gear ratios. Any gear ratio selected in this stage has a sum that is greater than the other sums. If none of the sums is greater than the threshold value of 30, then the first gear ratio determination process fails.

The third stage, shown in FIG. 6, is performed when the first gear ratio determination process fails. In the third stage, the controller waits a predetermined time interval. After that time interval, controller 234 calculates the speed ratio and determines the gearbox gear ratio based on that calculation. This process is repeatedly performed over a second time interval. At the end of this interval, controller 234 saves the last gear ratio it successfully determined as the correct gear ratio. Controller 234 does not sum its choices and select between them as it does in the first and second stages of the process. The speed ratio that controller 234 calculates here is the engine-to-rotor speed ratio. If both processes to determine the speed range fail, the last known valid gear selection would be used.

Details of the Gear Ratio Determination Process

In the discussion below, we refer to a counter or timer that is identified as "i". Variable "i" is automatically incremented every ten milliseconds when controller 234 executes the instructions below. Hence "i" always indicates the time in ten millisecond increments since the start of the rotor engagement and gear ratio determination processes.

Checking to see whether "i" equals 150, for example, is the same as testing whether 1.5 seconds have passed since the gear ratio determination process started.

Figure 3:
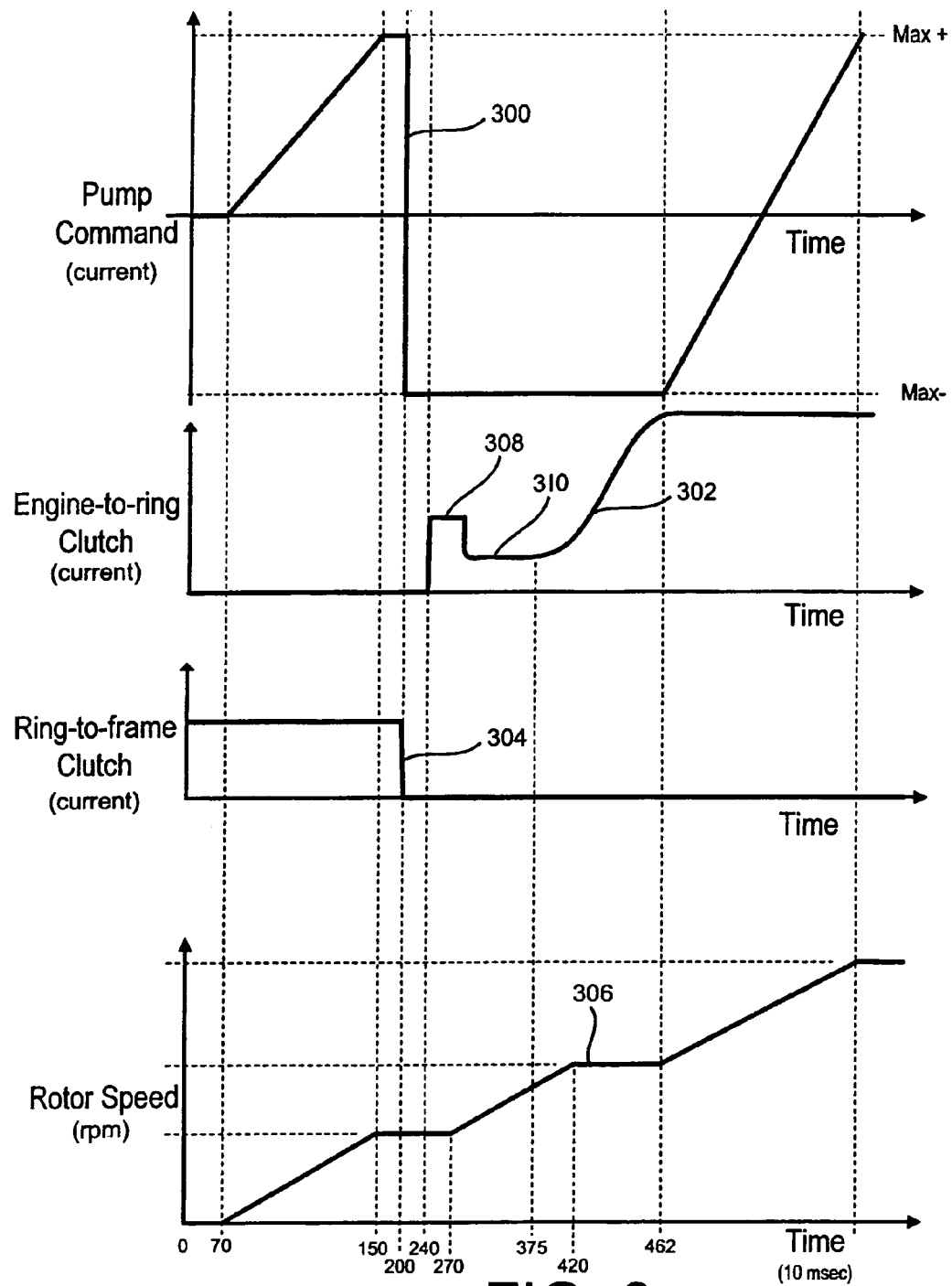
FIG. 3 is a timing diagram of the rotor acceleration process showing the rotor speed, clutch engagement signals and pump command signals for a time interval i=0 to i>462.

Controller 234 starts the gear ratio determination process in block 400. Controller 234 is configured to start this process every time the operator requests that the rotor be engaged and brought up to speed. This rotor engagement and acceleration process is shown in FIG. 3. It begins at time i=0.

After starting at time i=0 (block 400), controller 234 initializes several counters in block 402. Counter[2] will increase by 1 whenever controller 234 estimates that the gearbox 116 is in third gear. Counter[1] will increase by 1 whenever controller 234 estimates that the gearbox is in second gear. Counter[0] will increase by 1 whenever controller 234 estimates that gearbox 116 is in first gear.

Controller 234 then checks to see whether the rotor speed has stabilized and is ready to be checked (block 402). The speed is stabilized when controller 234 has accelerated the rotor for 1.5 seconds (i.e. when "i" is equal to or greater than 150 in block 402).

Once the time "i" is at least 150, the rotor is up to speed. Controller 234 then checks to make sure the first stage gear ratio determination is not complete by checking whether i<=199 (block 404). If the first stage is not complete, controller 234 continues to block 506.

In block 406, controller 234 reads the motor speed sensor and the rotor speed sensor and calculates the speed ratio— the ratio of the two (block 406). This speed ratio indicates the gear ratio of gearbox 116.

In block 408, controller 234 checks the speed ratio to see if it is within a range of 8 and 15. If it is, then controller 234 increments Counter[2], indicating that it has determined the gearbox to be in third gear. When gearbox 116 is in third gear, the actual speed ratio will be about 11. Rather than checking to see if the ratio is precisely 11 (as it should be if the gearbox is in third gear) the 8–15 range in block 406 accommodates for minor system errors.

If the speed ratio is not in this range (i.e. the gearbox 116 is not in third gear), controller 234 continues to block 410 and checks to see if the speed ratio is between 15 and 25. If it is, controller 234 increments Counter [1], indicating that it has determined the gearbox 116 to be in second gear. When gearbox 116 is in second gear, the actual speed ratio will be about 20. Rather than checking to see if the ratio is precisely 20 (as it should be if the gearbox is in second gear) the range of 15–25 in block 408 accommodates minor system errors.

If the speed ratio is not in this range (i.e. the gearbox 116 is not in second gear), controller 234 continues to block 412 and checks to see if the speed ratio is between 25 and 40. If it is, controller 234 increments Counter [0], indicating that it has determined the gearbox 116 to be in first gear. When gearbox 116 is in first gear, the actual speed ratio will be about 32.5. Rather than checking to see if the ratio is precisely 32.5 (as it should be if the gearbox is in first gear) the 25–40 range in block 410 accommodates minor system errors.

If the speed ratio is not in any of the three ranges, as indicated by the "no" branch from block 412, then an error has occurred and controller 234 does not increment Counter [0], Counter[1], or Counter[2].

Controller 234 proceeds to increment the time counter, "i" (block 420), and returns to block 404.

Controller 234 stays in the block 404–420 loop for 0.5 seconds (until i>199 in block 404) calculating fifty successive speed ratios, one calculated every ten milliseconds. Controller 234 simultaneously characterizes each of the fifty as representing the gearbox gear ratio as first, second or third gear.

If all fifty values do not agree, there may be a sensor failure or intermittent fault of some kind. It is for this reason that the second stage of gear ratio determination, in which it determines (1) which gear ratio was calculated more times than any others (i.e. 30 times, all others being calculated 20 times or less), (2) which gear ratio was calculated the majority of the times (i.e. 30 times out of a total of 50 times), and (3) which gear ratio was calculated more than a predetermined number of times (i.e. 30 times). This process is shown in FIG. 5.

In FIG. 5, controller 234 proceeds to examine the 50 calculated gear ratios (the three sums, Counter[0], Counter[1] and Counter[2]) and to decide which of the three gear ratios is correct. This further processing occurs when the time counter reaches 200.

When the time counter "i" reaches 200 and the 500 milliseconds of gear ratio calculations are finished, controller 234 will answer "no" to block 404. It will then continue to tag "A" (FIG. 5) and execute block 502. In block 502, controller 234 checks to see if time counter i equals 200, which it does. Controller 234 continues to block 504 and sets the flag "gear_found" equal to 1.

Controller 234 then executes block 506, checking Counter[0] to see if it is at least 30. Counter[0] will be at least 30 if the gear ratio calculated in FIG. 4 was indicated first gear 60% of the time (i.e. 30 out of the 50 times). If Counter[0] is at least 30, controller 234 proceeds to block 516 and sets ratio=1, indicating that gearbox 116 is in first gear.

On the other hand, if Counter[0] is not at least 30 in block 506, controller 234 then executes block 508, checking Counter[1] to see if it is at least 30. Counter[1] will be at least 30 if the gear ratio calculated in FIG. 4 indicated second gear 60% of the time (i.e. 30 out of the 50 times). If Counter[1] is at least thirty, controller 234 proceeds to block 518 and sets ratio=2, indicating that gearbox 116 is in second gear.

Alternatively, if Counter[1] is not at least 30 in block 508, controller 234 then executes block 510, checking Counter[2] to see if it is at least 30. Counter[2] will be at least 30 if the calculated gear ratio in FIG. 4 indicated third gear 60% of the time (i.e. 30 times out of the 50 times in FIG. 4 that controller 234 checked). If Counter[2] is at least thirty, controller 234 proceeds to block 520 and sets ratio=3, indicating that gearbox 116 is in third gear.

If controller 234 determines the gear ratio was first, second or third gear, then processing stops—the gear ratio determination process is complete, per block 522.

On the other hand, if no single gear ratio was calculated at least 60% of the time (30 times) in FIG. 4, then controller 234 sets the gear_found flag to false (i.e. "0") in block 512, "i" is incremented (block 514) and processing returns to block 502.

Since "i" now equals 201, controller 234 will answer "no" in block 502 and continue processing at block 602 in FIG. 6.

In block 602, controller 234 checks to see if the second phase of acceleration (FIG. 3) is complete—in other words, that the time count has reached i=420. Since i=201, controller 234 continues to block 604, in which "i" is incremented, indicating the passages of another ten milliseconds. This process of incrementing time counter i every ten milliseconds (block 604) continues until i=420—about 4.2 seconds into the rotor acceleration process of FIG. 3.

Controller 234 has now delayed until the rotor speed has stabilized with both the motor and the engine driving the rotor at a stable speed (see FIG. 3 and accompanying description).

Once i=420 in block 602, controller 234 continues to block 606, in which it checks to see if the time counter has reached 462, or 4.62 seconds into rotor acceleration process. When the time counter i reaches 462, controller 234 halts the gear estimation process (block 608).

While time counter i is between 420 (block 602) and 462 (block 606), however, controller 234 executes the program steps shown in blocks 610–624.

In block 610, controller 234 reads the engine speed sensor and the rotor speed sensor and saves the values. It then continues to block 612 where it examines the rotor speed (RS) to see if it is less than 0.152 times the engine speed (ES). In other words, to see if the engine-to-rotor speed ratio is less than 0.152.

For the particular embodiment illustrated herein, with the pump command at its negative maximum as shown in FIG. 3 at time i=420, this ratio can only occur when gearbox 116 is in first gear. If RS is less than 0.152 times ES, then controller 234 continues to block 614, where it sets ratio equal to 1, which indicates that gearbox 116 is in first gear.

If the answer to block 612 is "no", controller 234 continues to block 616, where it checks to see if RS is between 0.152 times ES and 0.243 times ES. In other words, to see if the engine-to-rotor speed ratio is greater than or equal to 0.152 and less than 0.243. If the answer is "yes", controller 234 continues to block 618, where it sets ratio equal to 2, which indicates that gearbox 116 is in second gear.

If the answer to block 616 is "no", controller 234 continues to block 620, where it checks to see if RS is between 0.243 times ES and 0.58 times ES. Expressed differently, it checks to see if the engine-to-rotor speed ratio is greater than or equal to 0.243 and less than 0.58. If the answer is "yes", controller 234 continues to block 622, where it sets ratio equal to 3, which indicates that gearbox 116 is in third gear.

If rotor speed RS meets none of the conditions of blocks 612, 616, and 620, then it is deemed to bean erroneous or incorrect reading and "ratio" is not set, as indicated by the "no" path extending from block 620 to block 624.

Having set "ratio" to either 1, 2, or 3 (or having not set "ratio" at all because the three tests of blocks 612, 616, 620 failed to identify a proper gear ratio), controller 234 then increments "i" (in block 624) and returns to block 606, where it again checks to see if "i" has reached 462.

After looping through blocks 606–624 several times, incrementing "i" on each pass, controller 234 will eventually go to block 608 and stop. This terminates the gear ratio determination process. The gear ratio that controller 234 finally determines in FIG. 6 is the last gear ratio selected in any of blocks 612, 616, 620.

Given the specific mathematical model of the drive system, whenever the pump command is set to its extreme negative position (see FIG. 3, for time i=420 through time i=462), the tests of block 612, 616, and 620 will identify the actual gear ratio of gearbox 116. As in the case of blocks 408, 410 and 412, the actual rotor-to-engine speed ratio is a fixed ingle value, and the ranges are provided to accommodate system errors such as clutch slippage or minor sensor flaws.

The particular constants used in blocks 408, 410, 412, 612, 616, and 620 will depend upon the specific drive systems design. A vehicle having different gears with different sizes engaging in a different manner will have a different system model and use different constants.

From the discussion above, it should be clear that the combine has a control system that calculates gear ratios based upon rotor speed signals, engine speed signals and motor speed signals.

It should also be clear that the system provides two alternative processes for determining the gear ratio, including a primary process and a redundant, supplemental, or fall-back process.

It should be clear that these two processes use different sensor signals and therefore can compensate for sensor failure, particularly failure of speed sensors, and more particularly for failure of a motor speed sensor.

It should also be clear that the two processes are performed during two different periods when the combine rotor is initially started, that they are performed automatically, and that they are performed automatically in response at least to the operator's request to start the rotor moving.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A process for determining whether a vehicle gearbox is engaged in at least a first gear ratio or a second gear ratio, the process comprising the steps of:
   calculating at least two times which of the first and second gear ratios the gearbox is engaged;
   summing the results of said calculations;
   determining whether the sum of first gear ratio determinations is greater than the sum of second gear ratio determinations; and
   selecting between the first and second gear ratios based on at least one of the results of the step of summing and the results of the step of determining.

2. The process of claim 1, wherein the step of calculating includes the step of determining a speed ratio.

3. The process of claim 2, wherein the speed ratio is a ratio of an input speed to said gearbox and an output speed from said gearbox.

4. The process of claim 3, wherein the step of summing includes the steps of summing occurrences of first gear ratio determinations and summing occurrences of second gear ratio determinations.

5. The process of claim 1, wherein the step of selecting between the first and second gear ratios includes the step of determining whether the sum of first gear ratio determinations and the sum of second gear ratio determinations exceed a minimum value.

6. The process of claim 1 wherein the step of calculating includes the step of determining a ratio of a motor speed signal and a rotor speed signal, and further wherein the step of selecting between includes the step of rejecting both the first and second gear ratios.

7. The process of claim 6, further comprising the steps of:
   waiting an interval of time after the step of rejecting; and
   calculating which of the first and second gear ratios the gearbox is engaged in after the step of waiting.

8. An apparatus for determining whether a vehicle gearbox is engaged in at least a first gear ratio or a second gear ratio, comprising:
   means for calculating at least two times which of the first and second gear ratios the gearbox is engaged;
   means for summing the results of said calculations;
   means for determining whether the sum of first gear ratio determinations is greater than the sum of second gear ratio determinations; and
   means for selecting between the first and second gear ratios based on at least one of the results of the step of summing and the results of the step of determining.

9. The apparatus of claim 8, wherein the means for calculating includes a means for determining a speed ratio.

10. The apparatus of claim 9, wherein the speed ratio is a ratio of an input speed to said gearbox and an output speed from said gearbox.

11. The apparatus of claim 10, wherein the means for summing includes means for summing occurrences of first gear ratio determinations and means for summing occurrences of second gear ratio determinations.

12. The apparatus o claim 8, wherein the means for selecting between the first and second gear ratios includes means for determining whether the sum of first gear ratio determinations and the sum of second gear ratio determinations exceed a minimum value.

13. The apparatus of claim 8, wherein the means for calculating includes means for determining a ratio of a motor speed signal and a rotor speed signal, and further wherein means for selecting between includes means for rejecting both the first and second gear ratios.

14. The apparatus of claim 13, further comprising:
   means for waiting an interval of time after the step of rejecting; and
   means for calculating which of the first and second gear ratios the gearbox is engaged in, after the step of waiting.

15. An electronic control system for determining whether a vehicle gearbox is engaged in at least a first gear ratio or a second gear ratio, comprising:
   (a) a first speed sensor;
   (b) a second speed sensor; and
   (c) at least one microcontroller configured to
      (i) calculate at least twice which of the first and second gear ratios the gearbox is engaged in,
      (ii) sum the results of said calculations,
      (iii) determine whether the sum of first gear ratio determinations is greater than the sum of second gear ratio determinations, and
      (iv) select between the first and second gear ratios based on at least one of the summed results and the determined results.

16. The system of claim 15, wherein the at least one microcontroller is configured to determine a speed ratio.

17. The system of claim 16, wherein the speed ratio is a ratio of a shaft input speed to said gearbox and a shaft output speed from said gearbox.

18. The system of claim 17, wherein the at least one microcontroller is configured to sum occurrences of first gear ratio determinations and sum occurrences of second gear ratio determinations.

19. The system of claim 15, wherein the at least one microcontroller is configured to determine whether the sum of first gear ratio determinations and the sum of second gear ratio determinations exceed a minimum value.

20. The system of claim 15 wherein the at least one microcontroller is configured to determine a ratio of a motor speed signal and a rotor speed signal, and to reject both the first and second gear ratios.

21. The system of claim 20, wherein the at least one microcontroller is configured to:
   wait an interval of time after the step of rejecting; and
   calculate in which of the first and second gear ratios the gearbox is engaged after the step of waiting.

22. The system of claim 15, wherein the gearbox is engageable in at least three gear ratios.

23. The process of claim 3, wherein the speed ratio is a ratio of an engine speed and rotor speed.

* * * * *